(12) United States Patent
Hertle et al.

(10) Patent No.: US 9,283,696 B2
(45) Date of Patent: Mar. 15, 2016

(54) MOLDING DEVICE

(71) Applicant: AIRBUS HELICOPTERS DEUTSCHLAND GMBH, Donauworth (DE)

(72) Inventors: Thomas Hertle, Harburg-Mauren (DE); Jan-Christoph Arent, Donauworth (DE); Christoph Loy, Weissenburg (DE)

(73) Assignee: Airbus Helicopters Deutschland GmbH, Donauworth (DE)

( * ) Notice: Subject to any disclaimer, the term of this patent is extended or adjusted under 35 U.S.C. 154(b) by 0 days.

(21) Appl. No.: 14/513,640

(22) Filed: Oct. 14, 2014

(65) Prior Publication Data

US 2015/0104536 A1 Apr. 16, 2015

(30) Foreign Application Priority Data

Oct. 15, 2013 (EP) .................................... 13400022

(51) Int. Cl.
| | |
|---|---|
| B29C 59/02 | (2006.01) |
| B29C 35/00 | (2006.01) |
| B29C 70/44 | (2006.01) |
| B29C 33/02 | (2006.01) |

(52) U.S. Cl.
CPC ............ B29C 35/007 (2013.01); B29C 33/02 (2013.01); B29C 70/44 (2013.01)

(58) Field of Classification Search
CPC .... B29C 35/007; B29C 35/041; B29C 70/54; B29C 70/443
USPC .................... 425/387.1, 389, 405.1, 420, 503
See application file for complete search history.

(56) References Cited

U.S. PATENT DOCUMENTS

| | | | | | |
|---|---|---|---|---|---|
| 4,409,170 | A | * | 10/1983 | Stofko | 425/420 |
| 5,382,150 | A | * | 1/1995 | Henrio | 425/390 |
| 5,603,871 | A | * | 2/1997 | Koseko et al. | 425/407 |
| 8,083,514 | B2 | * | 12/2011 | Chuang et al. | 425/384 |
| 2011/0175262 | A1 | * | 7/2011 | Kiyomi et al. | 425/405.2 |
| 2013/0040012 | A1 | | 2/2013 | Sugie et al. | |

FOREIGN PATENT DOCUMENTS

| | | |
|---|---|---|
| CA | 2593163 | 1/2008 |
| EP | 2184150 | 5/2010 |
| GB | 940407 | 10/1963 |
| JP | H0591820 | 12/1993 |
| WO | 8002528 | 11/1980 |

OTHER PUBLICATIONS

Extened European Search Report for EP 13400022.3, Completed by the European Patent Office, Dated Mar. 25, 2014, 6 Pages.

* cited by examiner

*Primary Examiner* — Joseph S Del Sole
*Assistant Examiner* — Thukhanh T Nguyen
(74) *Attorney, Agent, or Firm* — Brooks Kushman P.C.

(57) ABSTRACT

A molding device for curing of composite components comprising: a molding die, composite material in the molding die, heat application means, sheathing means for the composite material and the molding die and vacuum means for the application of vacuum to the composite material in the molding die. The heat application means comprise at least one heat pipe with a heat exchanger attached to the molding die for thermal conduction to the composite material.

20 Claims, 4 Drawing Sheets

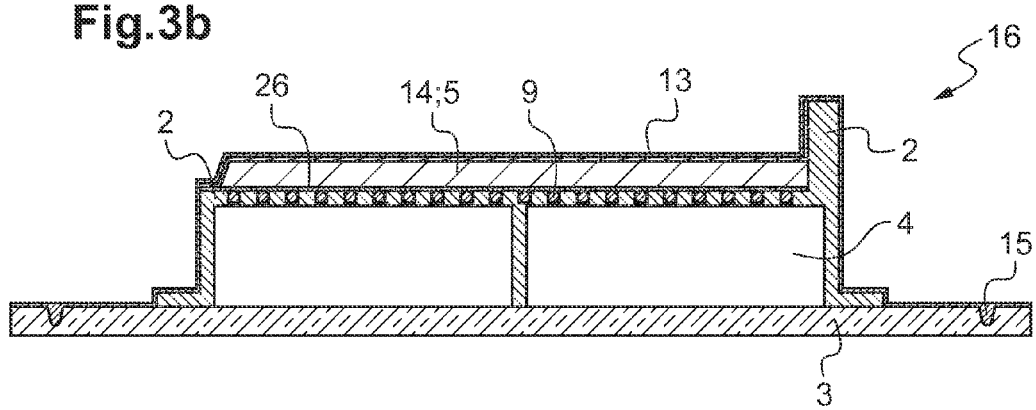
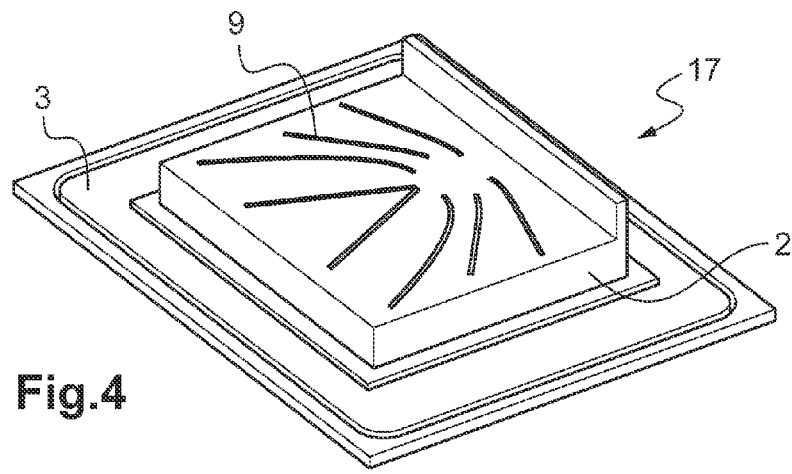
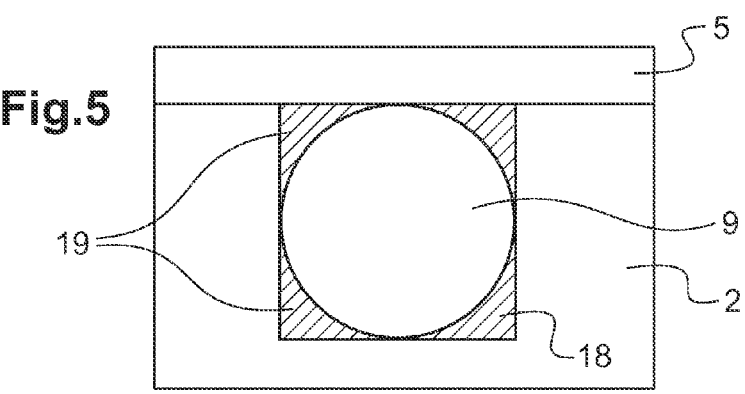

MOLDING DEVICE

CROSS REFERENCE TO RELATED APPLICATION

This application claims priority to European patent application No. 13 400022.3 filed on Oct. 15, 2013, the disclosure of which is incorporated in its entirety by reference herein.

BACKGROUND OF THE INVENTION (1) Field of the Invention

The invention is related to a molding device for composite components with the features of the preamble of claim 1.

(2) Description of Related Art

Molding of composite components in molding dies needs typically 180° C. for curing. When a thermal capacity is large of a molding die that is used for molding, it takes time for the heat to transfer from a heat source to a pressing surface contacting a product to be molded. Oil as heat transfer medium is incompatible with composite components and thus disadvantageous for the molding of composite components. Standard heat pipes provide heat at a temperature range from −20° C. to 230° C. depending from used internal medium. Standard heat pipes provide said heat with a safe isolation of any heat transfer medium from the composite components.

The document JP H05-91820 discloses a heat pipe embedded in a molding die for thermally molding material, so as to increase a thermal conductivity of the molding die.

The document U.S. 2013/040012 A provides a compression molding apparatus performing a molding by providing a raw material into a molding die, and applying heat and pressure to the raw material. The apparatus includes a first molding die that forms a molding frame that surrounds a region where the raw material is compression-molded; a second molding die that compresses the raw material provided into the molding frame; and a heat source section that supports and heats the second molding die. The second molding die includes a heat pipe that has one end positioned on a side of the heat source section and the other end positioned on a side of a pressing surface pressing the raw material, and a heat insulating layer that wraps the heat pipe along a longitudinal direction of the heat pipe. The compression molding apparatus of U.S. 2013/040012 A is not suitable for vacuum molding.

The object of the invention is to provide a molding device suitable for vacuum molding of composite components.

The solution to the problem is provided with a molding device with the features of claim 1.

BRIEF SUMMARY OF THE INVENTION

According to the invention a molding device for curing of composite components comprises a molding die for composite material in the molding die and heat application means to the molding die. Sheathing means encompass the composite material and the molding die for sealing off towards at least one vacuum chamber and vacuum means are provided at the molding device for the application of vacuum to the composite material in the molding die. The heat application means comprise at least one heat pipe, preferably with a heat exchanger, attached and/or integrated to the molding die for thermal conduction to the composite material on the molding die. The inventive molding device can be applied to any hot-molding of a composite component to be cured, for example tools which have been milled, casted or produced by electro plating.

A base plate of the molding device is in a two dimensional contact with a heat exchanger attached to the molding die for increased thermal conduction to the composite material inside vacuum, so that heat is effectively transferred through the vacuum by means of the heat pipe and through the molding die to the composite material to be cured. In the inventive molding device, the heat pipe has one end positioned on a side of a heat source section and the other end positioned on a surface adjacent the composite material to be molded. Thereby, it is possible to provide improved thermal conductivity In the heat pipe, a working fluid that is locally heated and evaporated condenses at a part to which the heat is to be supplied. The heat transferred through the heat pipe is instantaneously moved to the surface contacting the composite material to be cured and the heat diffuses into the entire molding die.

The inventive molding device avoids the leakage risks related to fluidic systems with a concept simple to connect and regulate with standard plant/equipment. The inventive molding device allows application to e.g. an autoclave or oven by economic system adjustment during design of any new tooling or the inventive molding device can be retrofitted to existing molding devices. The changes depend on which embodiment is desired. For e.g. a molding device with integrated heat pipes in the molding die and the existing base plate the following work would be required: Drilling and threat cutting of the base plate for mounting the outer heat exchanger.

For the molding die a milling process and a subsequent bonding of the heat pipes into the milled interstices would be required. For the inner heat exchanger a mill on the plant surfaces on the molding die and the base plate may be required. The use of heat-pipes allows on one hand increased heat supply into the inventive molding device by means of heat exchangers, e.g. fins, and allows—on the other hand—a homogenous distribution of energy within the inventive molding device.

By passive mode of operation, e.g. by putting the inventive molding device into e.g. an autoclave or oven, any overheating can be excluded. The inventive molding device allows a shortening of process time resulting in cost and energy savings. The quality of the composite component to be cured is improved due to time uniform cure by means of the inventive molding device. The inventive molding device with a heat-pipe operates completely independent without any operator intervention as said heat-pipe is wear and maintenance-free. For optimization of molding capacity any autoclave, oven, hot press can be retrofitted to any of the most affected inventive molding devices. Apart from optimization no conversion of autoclave, oven or hot forming means is necessary for the application of the inventive molding device According to a preferred embodiment of the invention the heat-pipes are integrated into the molding die for a more homogenous distribution of energy within the inventive molding device.

According to a further preferred embodiment of the invention the heat exchanger of the heat pipe is inside the molding die. The molding die wraps the heat pipe in the longitudinal direction of the heat pipe. Thereby, the heat of the heat source section is efficiently transferred to the composite material, so that efficient hot-molding becomes possible.

According to a further preferred embodiment of the invention the heat exchanger of the heat pipe is in contact with the composite material through the molding die.

According to a further preferred embodiment of the invention a plurality of heat pipes are arranged depending on the situation through the molding die e.g. in parallel or fan type arrangement.

According to a further preferred embodiment of the invention at least one outer heat pipe is connected for thermal conduction to an inner heat pipe through the molding die.

According to a further preferred embodiment of the invention a contact force generating element is provided between the heat exchangers, said contact force generating element pressing the die heat exchanger against the molding die and the base heat exchanger against the base plate for better thermal conduction by increased contact forces.

BRIEF DESCRIPTION OF THE SEVERAL VIEWS OF THE DRAWINGS

A preferred embodiment of the invention is presented by means of the description with reference to the attached drawing.

FIG. 3b shows a cross sectional view of the another molding device with integrated heat pipes according to the invention;

FIG. 4 shows a perspective view of still another molding device with integrated heat pipes inside the molding die according to the invention;

FIG. 5 shows a cross sectional view of a heat pipe integrated in the molding die according to the invention;

DETAILED DESCRIPTION OF THE INVENTION

Figure 1:
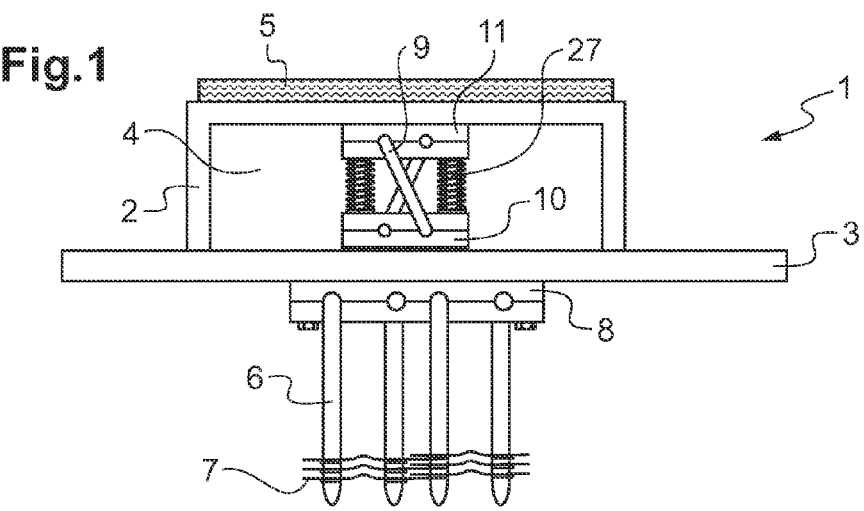
FIG. 1 shows schematically a structure of a retrofitting molding device according to a first embodiment of the invention.

According to FIG. 1 a retrofitting molding device 1 comprises a molding die 2 with a base plate 3 and a vacuum chamber 4 within the molding die 2 and the base plate 3. The composite material 5 to be cured is on the molding die 2.

An outer heat pipe 6 is provided with fins 7 as multi-layered heat exchanger at a free end of the outer heat pipe 6 and with a two-dimensional heat exchanger 8. The two-dimensional heat exchanger 8 of the outer heat pipe 6 is in planar contact for heat exchange to the base plate 3 of the molding die 2. The fins 7 of the multi-layered heat exchanger are adapted to supply heat into the outer heat pipe 6 while the two-dimensional heat exchanger 8 is adapted to supply the heat from the fins 7 into the base plate 3.

An inner heat pipe 9 is provided with a two-dimensional base heat exchanger 10 and a two-dimensional die heat exchanger 11. The two-dimensional base heat exchanger 10 is in planar contact for heat exchange with the base plate 3 and the two-dimensional die heat exchanger 11 is in planar contact for heat exchange with the molding die 2 for heat transfer to the composite material 5 to be cured on the molding die 2.

Heated air, e.g. from an autoclave, is applied through the fins 7 into the outer heat pipe 6 and said heat is transferred via the two-dimensional heat exchanger 8 to the base plate 3 of the molding die 2. The two-dimensional base heat exchanger 10 of the inner heat pipe 9 inside the vacuum chamber 4 is heated up through the base plate 3 with the heat from the outer heat pipe 6. Said heat of the two-dimensional base heat exchanger 10 is transferred via the inner heat pipe 9 to the two-dimensional die heat exchanger 11 for heat exchange with the molding die 2 and for heat transfer into the composite material 5 to be cured on the molding die 2.

Figure 2:
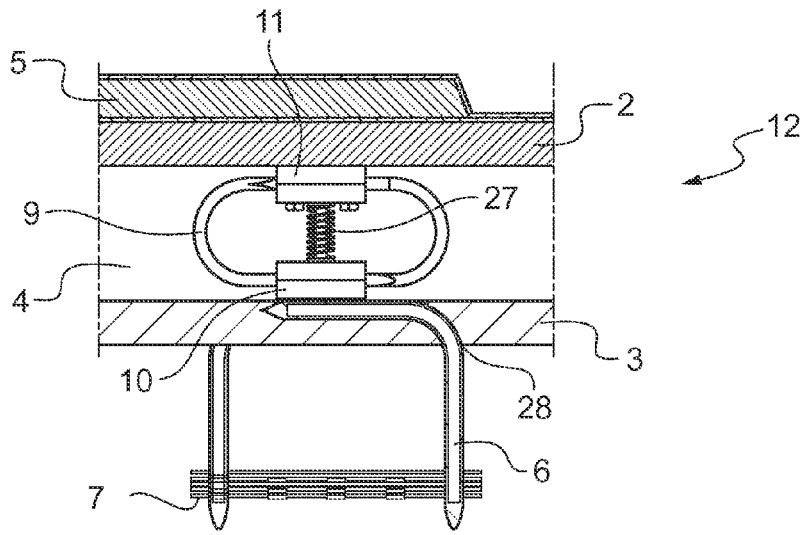
FIG. 2 shows schematically a structure of a further molding device according to a second embodiment of the invention.

According to FIG. 2 corresponding features are referred to with the references of FIG. 1. For a further molding device 12 with the fins 7 as multi-layered heat exchanger at a free end of the outer heat pipe 6 integrated in the base plate 3 is in contact with the two-dimensional base heat exchanger 10 of the inner heat pipe 9 at the base plate 3. The heat of the two-dimensional base heat exchanger 10 is transferred via the inner heat pipe 9 to the two-dimensional die heat exchanger 11 being in planar contact for heat exchange with the molding die 2 for heat transfer to the composite material 5 to be cured on the molding die 2.

Heated air is applied to the fins 7 of the outer heat pipe 6 and said heat is transferred via the two-dimensional heat exchanger 8 to the two-dimensional base heat exchanger 10 of the inner heat pipe 9 inside the vacuum chamber 4. Said heat is transferred to the two-dimensional die heat exchanger 11 for heat exchange with the molding die 2 and heat transfer to the composite material 5 to be cured on the molding die 2.

Figure 3A:
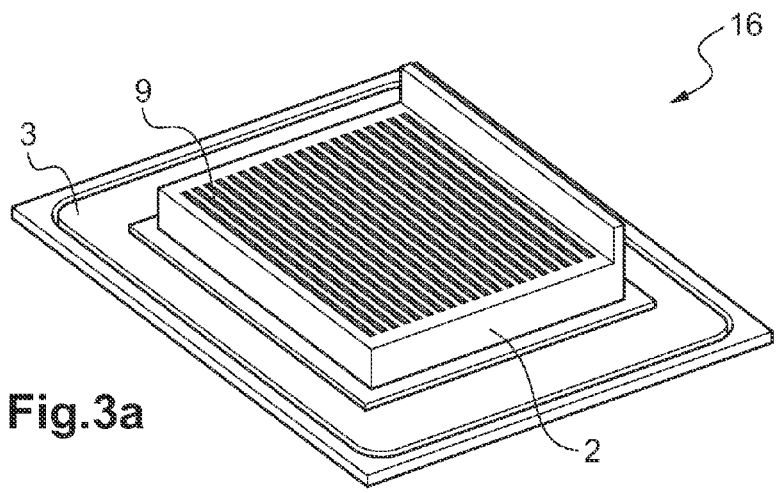
FIG. 3a shows a perspective view of a another molding device with integrated heat pipes according to the invention.

According to FIG. 3a, 3b corresponding features are referred to with the references of FIG. 1, 2. Another molding device 16 comprises a plurality of parallel inner heat pipes 9 integrated into the molding die 2 to provide a good heat distribution in the molding die 2 for a uniform curing of the composite component 5. The molding die 2 encloses vacuum chambers 4 above the base plate 3.

The composite component 5 to be molded comprises a lower carbon fiber composite (CFK) layer 26, an upper CFK layer 13 and honeycomb 14 between said lower and upper CFK layers 26, 13. The composite component 5 is sealed off by a vacuum foil 15 enclosing as well a lateral part of the molding die 2 and the base plate 3.

According to FIG. 4 corresponding features are referred to with the references of FIGS. 1-3. A still another molding device 17 comprises a plurality of fan shaped inner heat pipes 9 integrated for distributing the heat in the molding die 2 for a uniform curing of the composite component 5 which is located on the molding die 2.

According to FIG. 5 corresponding features are referred to with the references of FIGS. 1-4. The inner heat pipe 9 with a circular cross section is integrated fitting snugly into an interstice 18 with a rectangular cross section provided in the upper surface of the molding die 2 oriented towards the composite component 5.

Fill material 19 with a good heat conductance is provided into the interstice 18 and encloses the inner heat pipe 9. The upper surface of the molding die 2 oriented towards the composite component 5 and the fill material 19 are finished for adaption to the profile of the molding die 2.

Figure 6:
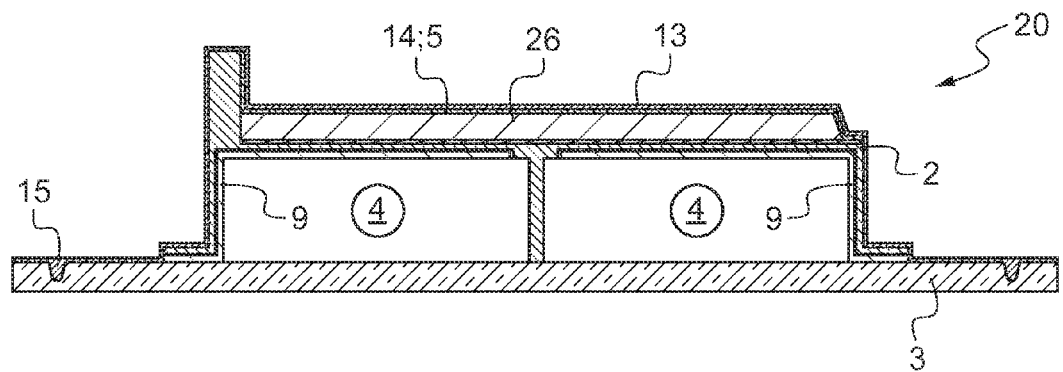
FIG. 6 shows a cross sectional view of an alternative molding device with a heat pipe below the molding die according to the invention.

According to FIG. 6 corresponding features are referred to with the references of FIG. 1-5. An alternative molding device 20 comprises inner heat pipes 9 attached integrally along a lower surface of the molding die 2 oriented away from the composite component 5 for molding. The molding die 2 along the parallel inner heat pipes 9 transfers heat to the composite component 5 on top of the molding die 2. The molding die 2 encloses vacuum chambers 4 above the base plate 3.

The composite component 5 to be molded comprises a lower carbon fiber composite (CFK) layer 26, an upper CFK layer 13 and honeycomb 14 between said lower and upper CFK layers 26, 13. The composite component 5 is sealed off by a vacuum foil 15 enclosing as well a lateral part of the molding die 2 and the base plate 3.

Figure 7:
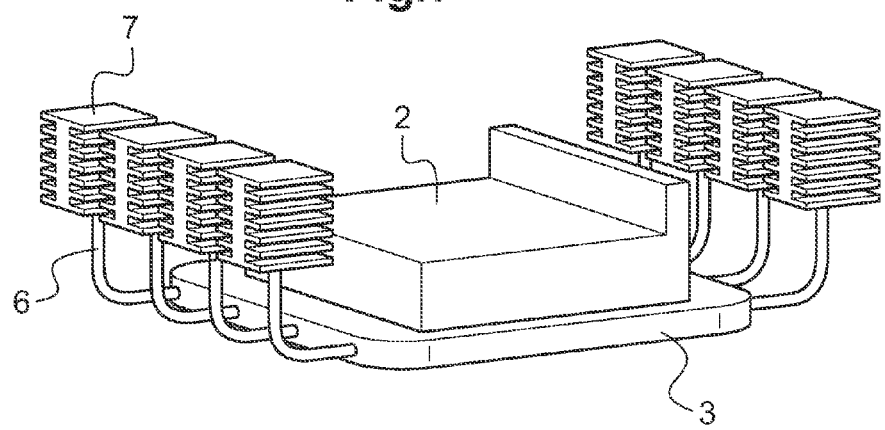
FIG. 7 shows an alternative molding device according to the invention.

According to FIG. 7 corresponding features are referred to with the references of FIG. 1-6. Eight separate heat pipes 6 each with external fins 7 are arranged in parallel inside the base plate 3 of the molding die 2 for heat transfer to the composite material 5 to be cured on the molding die 2.

Figure 8:
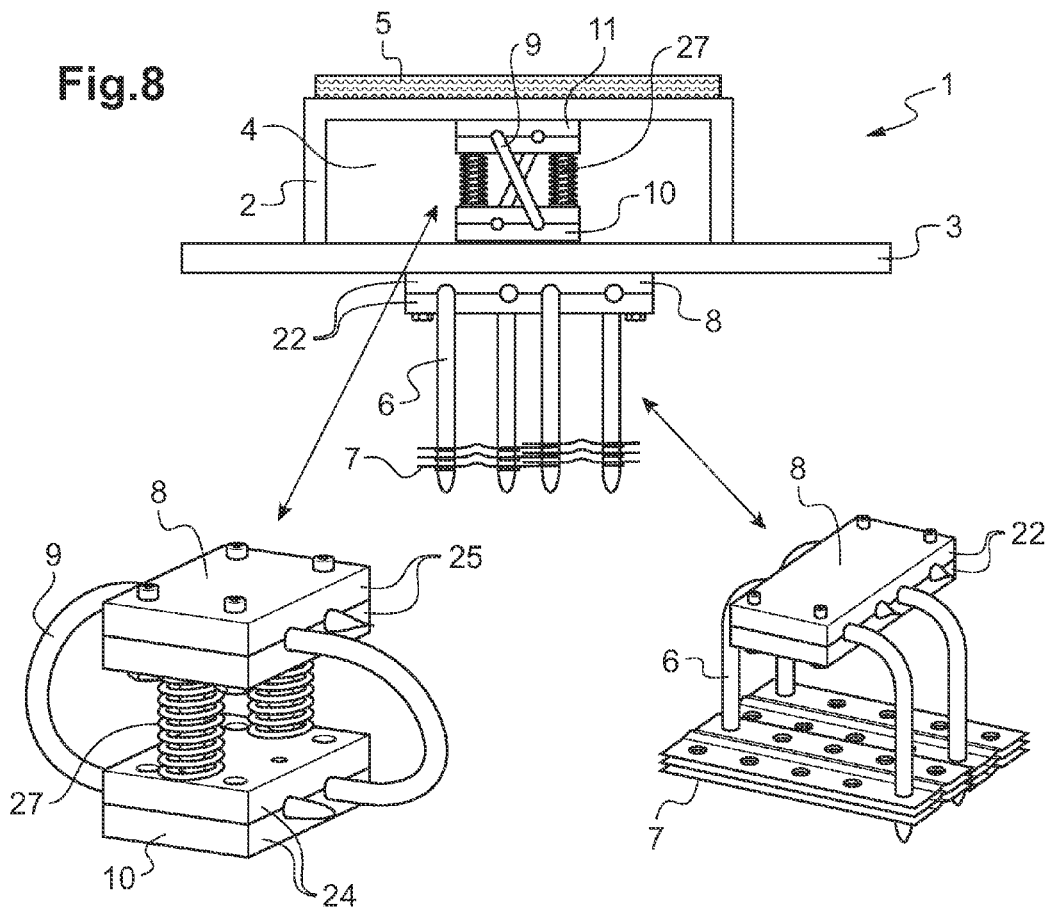
FIG. 8 shows a lateral view of the retrofitting molding device according to the first embodiment of the invention.

According to FIG. 8 corresponding features are referred to with the references of FIGS. 1-7. The retrofitting molding device 1 comprises an essentially cubic molding die 2 with the base plate 3 and the vacuum chamber 4 within the molding die 2 and the base plate 3. The composite material 5 to be cured is on the molding die 2.

The outer heat pipes 6 are arranged in L-shape with the fins 7 linked to two separate outer flanges 22 of the outer heat pipes 6. The two-dimensional heat exchanger 8 comprises two outer flanges 22 enclosing the four outer heat pipes 6. The two outer flanges 22 of the two-dimensional heat exchanger 8 are shaped for planar contact to the base plate 3.

The inner heat pipe 9 is essentially U-shaped with two separate inner brackets 23. The two-dimensional base heat exchanger 10 and the two-dimensional die heat exchanger 11 comprise respectively inner flanges 24, 25 for enclosing the two inner brackets 23 of the inner heat pipes 9. The two lower inner flanges 24 of the two-dimensional base heat exchanger 10 are shaped for planar contact for heat exchange with the base plate 3 and the two upper inner flanges 25 of the two-dimensional die heat exchanger 11 is in planar contact for heat exchange with the molding die 2 for heat transfer to the composite material 5 to be cured on the molding die 2. A contact force generating element 27, e.g. a spiral spring, is arranged between the heat exchangers 10 and 11 in order to press them against the molding die 2 and base plate 3 to reach a better thermal conduction. Alternatively a high contact force can be reached by magnetically designed heat exchangers 10 and 11.

Figure 9:
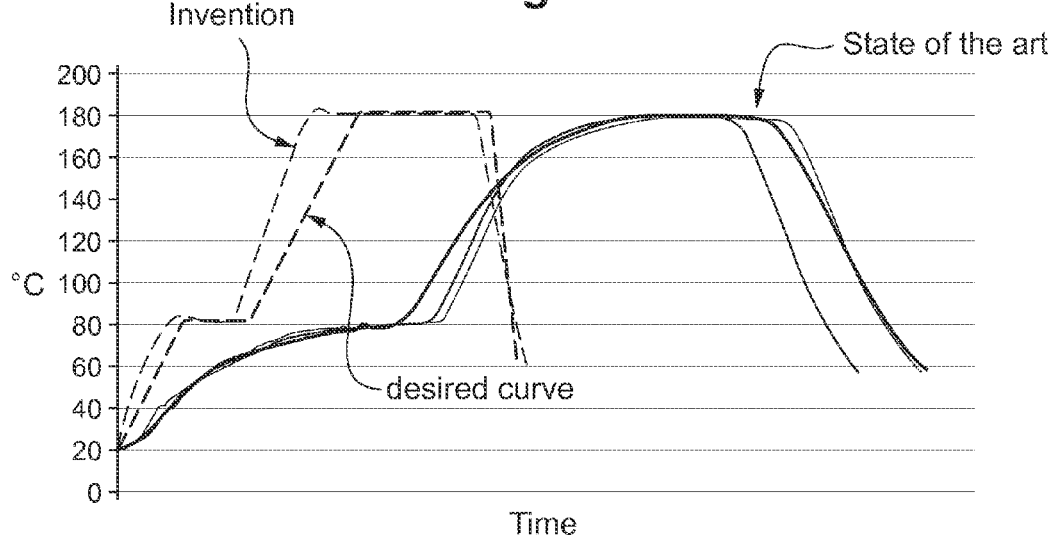
FIG. 9 shows a graph of a process with the retrofitting molding device according to the first embodiment of the invention.

According to FIG. 9 graphs with the temperature at the composite material 5 to be cured on the molding die 2 are plotted in function of the time spent for heating. The graphs to the right show the heat plotted in function of time spent for molding dies of the state of the art, the dashed line to the left shows the desired curve for heat plotted in function of time spent and the graphs to the left adjacent the dashed line show the heat plotted in function of time spent with the molding dies 1, 12, 16, 17, 20.

REFERENCE LIST 1 molding device
2 molding die
3 base plate
4 vacuum chamber
5 composite component
6 outer heat pipe
7 fins
8 two-dimensional heat exchanger
9 inner heat pipe
10 two-dimensional base heat exchanger
11 two-dimensional die heat exchanger
12 further molding device
13 upper carbon fiber composite layer
14 honeycomb
15 vacuum foil
16 another molding device
17 still another molding device
18 interstice
19 fill material
20 Alternative molding device
21 outer bracket
22 outer flanges
23 inner brackets
24 inner lower flanges
25 upper inner flanges
26 lower carbon fiber composite layer
27 contact force generating element

The invention claimed is:

1. A molding device for curing of composite components comprising:
   a molding die;
   heat application means;
   sheathing means for sealing the composite components and the molding die off about at least one vacuum chamber; and
   vacuum means applying a vacuum to the composite components in/on the molding die via the vacuum chamber, wherein
   the heat application means comprise at least one heat pipe integrated into the molding die for heat exchange to the molding die for thermal conduction to the composite components.

2. The molding device according to claim 1, wherein at least one heat exchanger is provided with the heat pipe, the at least one heat exchanger being inside the molding die.

3. The molding device according to claim 2, wherein the heat exchanger of the heat pipe is in contact with the composite components through the molding die.

4. The molding device according to claim 1, wherein a plurality of heat pipes are arranged in parallel through the molding die.

5. The molding device according to claim 1, wherein a plurality of heat pipes have a fan type arrangement in the molding die.

6. The molding device according to claim 1, wherein at least one outer heat pipe is connected for thermal conduction to an inner heat pipe through the molding die.

7. The molding device according to claim 2, wherein the at least one heat exchanger comprises a die heat exchanger and a base heat exchanger and wherein a contact force generating element is provided between the die heat exchanger and the base heat exchanger, the contact force generating element pressing the die heat exchanger against the molding die and the base heat exchanger against a base plate.

8. A molding device for curing of composite components comprising:
   a molding die supported by a base plate and defining a vacuum chamber therein;
   a sheathing foil configured to seal composite components and the molding die off about the vacuum chamber;
   a vacuum source configured to apply a vacuum to the composite components on the molding die via the vacuum chamber; and
   a heat pipe integrated into the molding die for heat exchange to the molding die for thermal conduction to heat the composite components, the heat pipe comprising a closed tube containing a working fluid, the closed tube having a first end in contact for heat exchange with the molding die and a second end spaced apart therefrom, wherein the heat pipe is configured such that the working fluid is locally heated and evaporated at the second end and the working fluid is condensed at the first end to supply heat to the molding die.

9. The molding device of claim 8 wherein the heat pipe is an inner heat pipe and is positioned within the vacuum chamber, wherein the second end is in contact for heat exchange with the base plate.

10. The molding device of claim 9 further comprising a die heat exchanger in planar contact with the molding die, the die heat exchanger enclosing a portion of the inner heat pipe and positioned within the vacuum chamber.

11. The molding device of claim 10 further comprising a base heat exchanger in planar contact with the base plate, the die heat exchanger enclosing another portion of the inner heat pipe and positioned within the vacuum chamber.

12. The molding device of claim 11 further comprising a contact force generating element provided between the die heat exchanger and the base heat exchanger, the contact force generating element adapted to press the die heat exchanger against the molding die and the base heat exchanger against the base plate.

13. The molding device of claim 9 further comprising an outer heat pipe having a first end region in contact for heat exchange with the base plate and a second end region provided with fins.

14. The molding device of claim 8 wherein the molding die defines a surface oriented towards the composite components, the surface defining an interstice; and
wherein at least a portion of the heat pipe is received within the interstice.

15. The molding device of claim 14 wherein the interstice has a rectangular cross section and the heat pipe has a circular cross section.

16. The molding device of claim 14 further comprising a fill material provided in the interstice and enclosing the heat pipe; wherein the surface of the molding die and the fill material are finished for adaptation to a profile of the molding die.

17. The molding device according to claim 8 wherein the heat pipe is U-shaped.

18. The molding device according to claim 12 wherein the contact force generating element is a spiral spring.

19. The molding device according to claim 1 wherein the heat pipe comprises a closed tube containing a working fluid, the tube extending from a first end to a second opposed end, the first end integrated into the molding die, the second end spaced apart from the first end and apart from the molding die, the heat pipe configured to isolate the working fluid from the composite components, wherein the heat pipe is configured such that the working fluid is locally heated and evaporated at the second end and the working fluid is condensed at the first end to supply heat to the molding die.

20. A molding device for curing of composite components comprising:
a molding die supported by a base plate and defining a vacuum chamber therein;
a sheathing foil configured to seat composite components and the molding die off about the vacuum chamber;
a vacuum source configured to apply a vacuum to the composite components on the molding die via the vacuum chamber;
an inner heat pipe integrated into the molding die for heat exchange to the molding die for thermal conduction to heat the composite components, the inner heat pipe positioned within the vacuum chamber, the inner heat pipe having a first end region in contact for heat exchange with the molding die and a second end region in contact for heat exchange with the base plate; and
an outer heat pipe having a first end region in contact for heat exchange with the base plate and a second end region provided with fins.

* * * * *